United States Patent [19]
Witt

[11] Patent Number: 5,835,753
[45] Date of Patent: *Nov. 10, 1998

[54] MICROPROCESSOR WITH DYNAMICALLY EXTENDABLE PIPELINE STAGES AND A CLASSIFYING CIRCUIT

[75] Inventor: David B. Witt, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 421,434

[22] Filed: Apr. 12, 1995

[51] Int. Cl.$^6$ ............................................ G06F 9/22
[52] U.S. Cl. .................................... 395/559; 395/395
[58] Field of Search .................... 395/820, 395, 395/551, 552, 555, 556, 559

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,807,115 | 2/1989 | Torng | 395/391 |
| 4,855,947 | 8/1989 | Zmyslowski | 395/392 |
| 4,858,105 | 8/1989 | Kuriyama et al. | 395/582 |
| 4,991,078 | 2/1991 | Wilhelm | 395/800 |
| 5,150,468 | 9/1992 | Staplin | 395/375 |
| 5,226,126 | 7/1993 | McFarland et al. | 395/394 |
| 5,226,130 | 7/1993 | Favor et al. | 395/585 |
| 5,363,495 | 11/1994 | Fry | 395/375 |
| 5,553,276 | 9/1996 | Dean | 395/555 |
| 5,590,359 | 12/1996 | Shavangpani | 395/800 |
| 5,625,806 | 4/1997 | Kromer | 395/556 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: the Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Eric Coleman
*Attorney, Agent, or Firm*—Conley, Rose & Tayon, PC; B. Noel Kivlin

[57] ABSTRACT

A pipelined microprocessor containing a classifying circuit is provided. The classifying circuit allows an associated pipeline stage to implement a function requiring a larger number of cascaded logic levels than the clock cycle of the microprocessor will allow. The classifying circuit is especially useful with a pipeline stage which implements a "fundamental limit" function (i.e. a function that does not naturally divide into component functions which could be implemented as separate pipeline stages). When an evaluation time larger than a clock cycle is required, the classifying circuit holds the associated pipeline register, thus allowing the circuit to continue uninterrupted with its evaluation. The time interval available for the fundamental limit stage is dynamically extended. Furthermore, in cycles where the fundamental limit function is not required to evaluate, the pipeline operates at a significantly higher clock rate.

23 Claims, 5 Drawing Sheets

MICROPROCESSOR WITH DYNAMICALLY EXTENDABLE PIPELINE STAGES AND A CLASSIFYING CIRCUIT

BACKGROUND OF THE INVENTION

1. Field of the Invention

This invention relates to the field of microprocessors and, more particularly to pipeline techniques employed within microprocessors.

2. Description of the Relevant Art

Microprocessors are a key component in computer systems. Generally, the microprocessor is the master in a computer system, controlling other components according to a sequence of instructions provided by a user. The sequence of instructions is referred to as a program. Because the microprocessor is the master, many times the performance of the computer system is characterized by the performance of the microprocessor. As a result, microprocessor manufacturers have made dedicated efforts to increase the performance of their microprocessors.

One common performance improvement technique implemented in microprocessors is "pipelining". Pipelining involves dividing a complex function that needs to be performed upon an object into a collection of sequential, independent tasks. Each of the independent tasks can then be assigned to a location where that task would be performed upon any object moved to that location. A "pipeline" is defined as the collection of locations and the tasks performed at those locations. A "pipeline stage" can then be defined as a location within the pipeline. By implementing the independent tasks in separate locations, the complex function may be performed on multiple objects simultaneously. No single performance of the complex function occurs more quickly, but the aggregate amount of time necessary to perform the task on multiple objects decreases.

Objects enter a pipeline and flow through the pipeline stages. When an object is moved out of a pipeline stage, another object may move into that pipeline stage. In order for a pipeline to function, it is necessary that objects move from pipeline stage to pipeline stage simultaneously, so that at no time is a given pipeline stage expected to retain a previous object and accept a new object. Additionally, no object is permitted to leave a pipeline stage until that pipeline stage has completed performing its task on the object. The two above mentioned requirements lead to the assignment of a fixed time interval to a pipeline. As each time interval expires, the objects within the pipeline move to the next pipeline stage. Therefore, the time interval for a particular pipeline is required to be at least as large as the largest amount of time required to execute a given independent task. In a microprocessor, the time interval is defined by a clock signal which opens and closes registers that define the pipeline stages and other storage locations within the processor. A "register" is a storage device that is directed by a clock to accept new values at regular intervals. A certain type of register known as a single phase register opens when the clock signal makes a transition, and closes a short time later. During the time that the register is "open", it accepts a new value. During the time that the register is "closed" it retains the value that it accepted when it was last opened. Accepting a new value into a register is referred to as "sampling" a value. The time interval in a microprocessor is referred to as a "clock cycle".

The simultaneous movement of objects between pipeline stages is referred to as "advancing" the pipeline. Sometimes, a pipeline is defined having situations where the pipeline cannot advance in some time intervals. Such a situation may exist, for example, when two pipeline stages share a resource that is occasionally used by one stage or the other. In cases where the resource is needed by both pipeline stages, then one stage will use the resource in a time interval, the pipeline is not advanced at the end of the time interval, and then the other stage uses the resource. At the end of the second time interval, the pipeline advances. Not advancing the pipeline at the end of a time interval is referred to as "stalling" the pipeline. Pipeline stages are connected in the order that the associated tasks are performed. A pipeline stage that receives an object before that object passes to a second pipeline stage is said to be "upstream" of that second pipeline stage. A pipeline stage that receives an object after a second pipeline stage has received the object is said to be "downstream" from that second pipeline stage.

A problem occurs when pipeline stages cannot be assigned independent tasks that require similar time intervals. The time interval must be set equal to or greater than the largest amount of time required to perform any of the independent tasks implemented in the pipeline. Therefore, the stages requiring less than the time interval to complete their task idle for the remainder of the time interval. In some cases, the set of pipeline tasks actually requires more time to execute than the complex function would require if implemented in a single step. Among the reasons why the complex function can be faster than the pipelined implementation of the complex function are that idle times exist for stages that complete their tasks in less time than the allotted time interval, and that a finite amount of time is required to advance the pipeline. Therefore, each added stage increases the amount of time required to complete the complex task on a single object. In some cases, a task associated with a pipeline stage can be further divided into tasks that can be implemented in separate stages. Such a division is desirable in cases where the task to be divided is the task that determines the necessary time interval, and the remaining tasks in the pipeline require significantly less time to complete. In other cases, however, a task cannot be naturally divided.

A particularly important application of pipelining in microprocessors is the processing of instructions. In order to process an instruction, a complex set of functions must be performed: the instruction must be retrieved from memory ("fetching"); the operations required by the instruction must be determined ("decoding"); the instruction must be transferred to an execution unit ("dispatching"); the operations required by the instruction must be performed ("executing"); and the results of the operations must be recorded ("writeback"). If these functions are performed separately in a non-pipelined fashion for each instruction in a program, the time required to process all the instructions in the program would be large. However, if the tasks are divided into stages in which each stage requires a similar amount of time to perform its assigned task, then the execution of instructions may overlap each other.

A microprocessor instruction processing pipeline exhibits the problem of tasks that do not divide naturally. An example of a task that does not divide naturally is an addition of two 32 bit numbers. The addition requires a fixed amount of time to complete. However, many times the upper order bits of the addition are not needed because their value is known before the operation starts. For example, an addition of two eight bit numbers (which typically uses the same adder circuit as the 32 bit numbers) produces a result in which the upper order 24 bits are zero. Certain operations (such as a 32 bit addition, for example) are often considered to be a fundamental limit to the clock cycle for a given semiconductor technology. In other words, the clock cycle cannot be any shorter than the time required to execute the "fundamental limit" operations, because they cannot be easily divided into smaller tasks. When the remaining stages in the microprocessor execution pipeline require less time than the fundamental limit operations, the performance problems described above are encountered. A solution to the fundamental clock cycle limit problem is therefore desired.

SUMMARY OF THE INVENTION

The problems outlined above are in large part solved by a microprocessor employing a classifier circuit in accordance with the present invention. The microprocessor contains a pipeline, and at least one of the stages in the pipeline embodies a circuit that requires significantly more cascaded levels of logic to implement than the other stages require. The logic stage implementing the larger number of cascaded logic levels represents a fundamental limit function. The clock cycle for this pipeline is chosen as the maximum delay required for the other pipeline stages, excluding the fundamental limit stage. Associated with the stage embodying the fundamental limit function is a classifying circuit. The classifying circuit determines whether or not the fundamental limit function requires an evaluation time larger than the clock cycle. When more evaluation time is required, the classifying circuit holds the pipeline register at the input to the fundamental limit stage, such that the pipeline register retains the current value. Because the input to the circuit does not change, the circuit continues uninterrupted with its evaluation. Therefore, the time interval available for evaluation of the fundamental limit function is dynamically extended when extra time is required. Furthermore, in cycles where the evaluation of the fundamental limit function is not required, the pipeline operates at a significantly higher clock rate (i.e. the clock cycle is significantly shorter) than would be possible in the absence of the classifying circuit. Therefore, a pipeline advances according to a clock cycle shorter than the evaluation time of a fundamental limit function that it embodies, except for the clock cycles in which the fundamental limit function is required to evaluate. In many cases, the fundamental limit function is used rarely and so the pipeline will advance a large majority of the time without any stalls, and thus performance will be increased.

In one embodiment, the classifying circuit also produces an output signal line for the stage immediately downstream of the fundamental limit stage. During clock cycles where the classifying circuit is generating a hold, the classifying circuit also conveys an invalid value on the output signal line. The invalid value will cause the downstream stage to disregard the input data for that clock cycle. Therefore, downstream pipeline stages need not be held when a fundamental limit function is executed. In cases where the fundamental limit stage has several downstream pipeline stages, performance is further increased by allowing downstream operations to advance while the fundamental limit stage and upstream stages are stalled.

Broadly speaking, the present invention contemplates a microprocessor comprising a clock input line, a functional circuit, and a classifying circuit. The clock input line conveys a signal which defines a clock cycle. The functional circuit receives an input value, and is configured to operate on the input value. Additionally, the cascaded levels of logic that perform the operation of the functional circuit require a total delay that is larger than the clock cycle. Furthermore, the functional circuit is configured with an output. Also receiving the input value received by the functional circuit, the classifying circuit generates an operation status indicating the validity of the output configured into the functional circuit.

The present invention further contemplates a classifying circuit comprising an input bus, a circuit coupled to said input bus, and an output bus. The circuit operates on the value conveyed upon said input bus to generate an operation status, indicating whether or not an associated functional circuit will complete its task by the end of the current clock cycle. Furthermore, the circuit generates controls for the pipeline register associated with the functional circuit, causing the pipeline to either advance or stall in the current clock cycle.

The present invention further contemplates a method for operating a pipeline stage in a microprocessor. The pipeline stage comprises a classifying circuit and a pipeline stage register. Two steps comprise the method: advancing the pipeline stage during clock cycles in which the classifying circuit generates a release value; and stalling the pipeline stage during clock cycles in which the classifying circuit generates a hold value.

BRIEF DESCRIPTION OF THE DRAWINGS

Other objects and advantages of the invention will become apparent upon reading the following detailed description and upon reference to the accompanying drawings in which.

Figure 1:
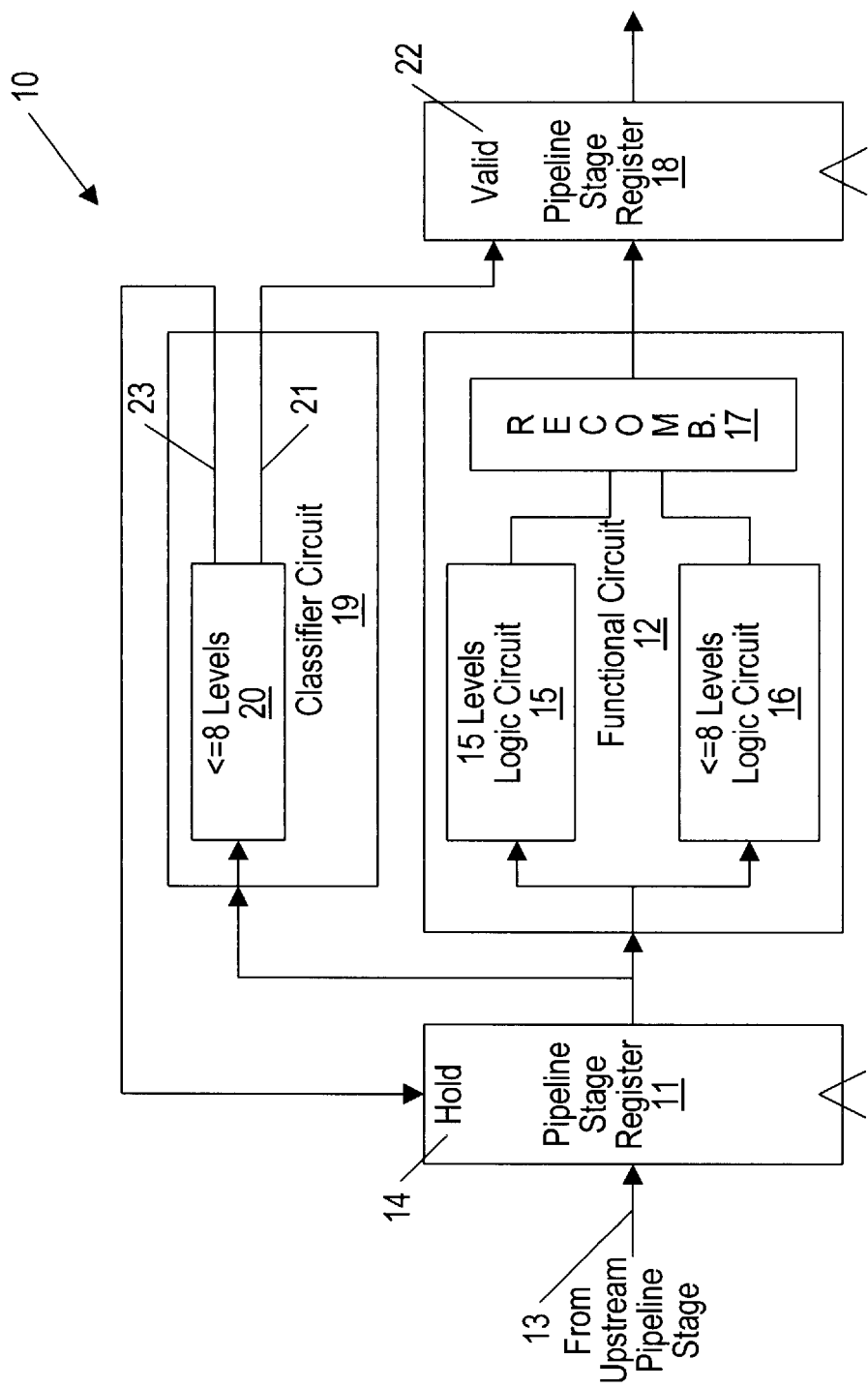
FIG. 1 is a block diagram showing a portion of an embodiment of a pipeline with fast and slow execution paths and a classifier circuit in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of an embodiment of a pipeline stage 10 and a functional circuit 12 which implements a task associated with pipeline stage 10 is shown. Pipeline stage register 11 is coupled to input bus 13 from an upstream pipeline stage (not shown). A functional circuit 12 performs the task associated with pipeline stage 10. As used herein, the term "functional circuit" means a logic circuit designed to perform a specific function. Pipeline stage register 11 is shown with a hold input port 14.

When a hold signal conveyed on a hold signal line coupled to hold input port 14 is active during the time that pipeline stage register 11 is open, the currently stored value in pipeline stage register 11 is retained and the value on input bus 13 is ignored. Conversely, when the hold signal is inactive during the time that pipeline stage register 11 is open, the value on input bus 13 is stored into pipeline stage register 11. The value stored in register 11 includes information necessary to perform the task of pipeline stage 10. For example, if pipeline stage 10 is an execute stage performing an addition of two integers, then the two integers and an indicator that addition is to be performed are a portion of the value stored in register 11.

Classifying circuit 19 produces the aforementioned hold signal. Generally speaking, classifying circuit 19 determines whether or not the output of functional circuit 12 will be valid in a given clock cycle. The clock cycle has been chosen for this embodiment as a time interval equal to the delay of eight cascaded levels of logic. However, functional circuit 12 includes a logic circuit 15 which requires fifteen levels of logic to implement. Therefore, during cycles in which the value in register 11 requires logic circuit 15 to evaluate, more time is required than one clock cycle to generate the output of functional circuit 12. Classifying circuit 19 provides the extra required time by signalling register 11 to hold the current value for an additional clock cycle. Classifying circuit 19 and other features of pipeline stage 10 will be described in more detail below.

As shown in FIG. 1, functional circuit 12 includes two logic circuits within it. Logic circuit 15 requires fifteen cascaded levels of logic to implement, and is a fundamental limit-type circuit as described above. Without the classifying circuit of the present invention, the clock cycle of a pipeline including pipeline stage 10 would be defined by the delay associated with logic circuit 15. Exemplary forms of logic circuit 15 are a 32 bit adder circuit or a shifter circuit for shifting a value wherein a shift amount is provided by a second value contained within 32 bits. As used herein, the term "level of logic" refers to a three input NAND gate, or its delay-equivalent. A level of logic has an associated delay. The delays of the cascaded levels of logic of a pipeline stage, added together, represent the amount of time required to perform the task assigned to the pipeline stage. The second logic circuit 16 requires eight cascaded levels of logic to implement. Exemplary forms of logic circuit 16 are an 8 bit adder circuit, a shifter circuit for shifting a value wherein the shift amount is provided by a second value having 8 bits, etc. A recombination circuit 17 combines the outputs of logic circuits 15 and 16 into an output which is coupled to a next pipeline stage register 18. Pipeline stage register 18 includes a valid indicator 22 as a portion of the value stored within it.

For the embodiment shown in FIG. 1, the value stored in register 11 determines which of the logic circuits 15 and 16 operates on the value to produce the output. Either logic circuit 15 or logic circuit 16 may operate on the value, or both logic circuit 15 and logic circuit 16 may operate on the value. It is noted that logic circuit 15 or 16, when not operating on a given value, is logically idle during the clock cycle, although some of its circuits may switch due to the applied input.

When logic circuit 16 is operating on the value stored in register 11 and logic circuit 15 is idle, the output is available in one clock cycle as defined above. However, during clock cycles in which logic circuit 15 is operating on a value, the output will not be available at the end of the clock cycle.

Classifying circuit 19 provides the functionality necessary to advance the pipeline according to the defined clock cycle. Classifying circuit 19 determines, in a logic circuit 20 that requires less than or equal to eight cascaded levels of logic to implement, whether or not the output of pipeline stage 10 will be available at the end of the current clock cycle. If the output will be available at the end of the current clock cycle, the output is said to be "valid" in the clock cycle. If the output will not be available at the end of the clock cycle, the output is said to be "invalid" in the clock cycle.

Classifying circuit 19 generates an "operation status" identifying whether or not the output will be valid or invalid and further identifying whether to hold or to release the value stored in register 11. During clock cycles in which the output will be invalid because logic circuit 15 must evaluate and has not completed evaluation, classifying circuit 19 produces an operation status comprising a hold value and an invalid value. During clock cycles in which the output will be valid because logic circuit 16 must evaluate or logic circuit 15 is evaluating but will complete evaluation in the current clock cycle, classifying circuit 19 produces an operation status comprising a release value and a valid value. Additionally, if register 11 does not contain a valid value in a clock cycle, classifying circuit 19 produces an operation status comprising a release value and an invalid value.

Classifying circuit 19 is configured in this embodiment with a pair of output lines 21 and 23. Output line 21 is coupled to the valid indicator 22 of pipeline register 18. Output line 23 is coupled to hold input port 14 of pipeline register 11. In the embodiment shown in FIG. 1, the hold value is conveyed as a logical one and the release value is conveyed as a logical zero on output line 23. Additionally, the valid value is conveyed as a logical one and the invalid value is conveyed as a logical zero on output line 21.

Classifying circuit 19 decodes the value stored in register 11 and determines whether or not evaluation of logic circuit 15 is required. Classifying circuit 19 stores the operation status it produces each clock cycle in a register within logic circuit 20 or in register 11. In some embodiments, classifying circuit 19 may store certain other values in a register within logic circuit 20 or in register 11.

During clock cycles in which classifying circuit 19 produces a release value within its operation status, the pipeline advances. During clock cycles in which the classifying circuit 19 produces a hold value within its operation status, the pipeline stalls. Additionally, output line 23 is active such that the value stored in register 11 remains stored in register 11 during the next clock cycle. Because the value stored in register 11 does not change, logic circuit 15 continues to operate on the value and will produce a valid output by the end of the clock cycle. Therefore, a pipeline has been created that operates in half the clock cycle required to compute a fundamental limit when the function embodying that fundamental limit is not required.

Figure 2:
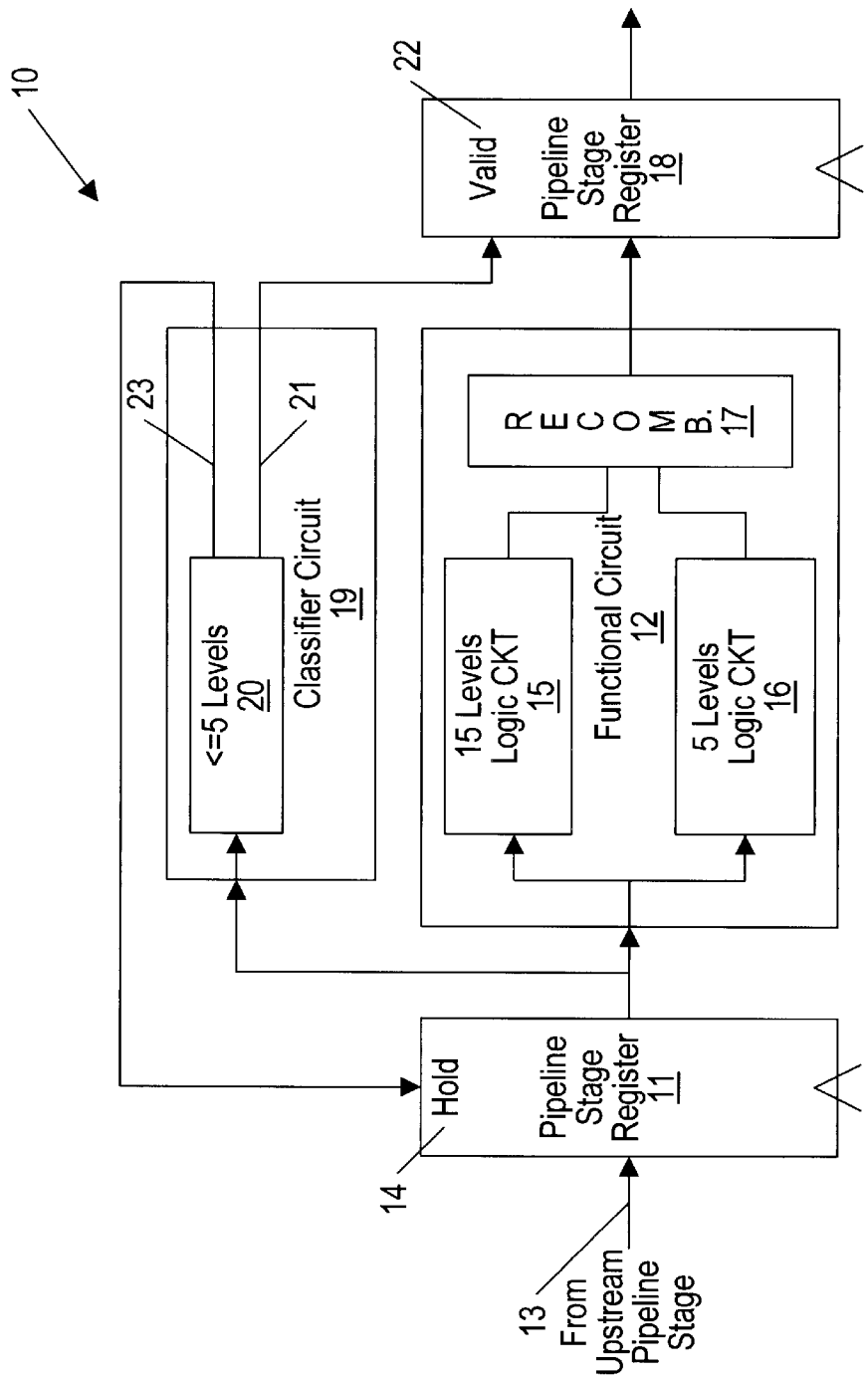
FIG. 2 is a block diagram showing a second embodiment of the pipeline stage with fast and slow execution paths and a classifier circuit in accordance with the present invention.

Turning now to FIG. 2, another embodiment of pipeline stage 10 is shown. In this embodiment, logic circuit 15 is again a fundamental limit function requiring fifteen cascaded levels of logic to implement. However, logic circuit 16 requires five cascaded levels of logic to implement. If the other pipeline stages (not shown) in the pipeline with pipeline stage 10 are also implemented in five levels of logic or less (or contain classifying circuits 19), then the pipeline could be operated at a clock cycle equal to the delay of five cascaded logic levels. Therefore, classifying circuit 19 would need to be implemented in five levels of logic or less. Additionally, when register 11 samples a value requiring evaluation of logic circuit 15, classifying circuit 19 must produce a hold value and an invalid value for its operation status in the two consecutive clock cycles after the value is received, followed by a release value and a valid value for the operation status in the third consecutive clock cycle.

Figure 3:
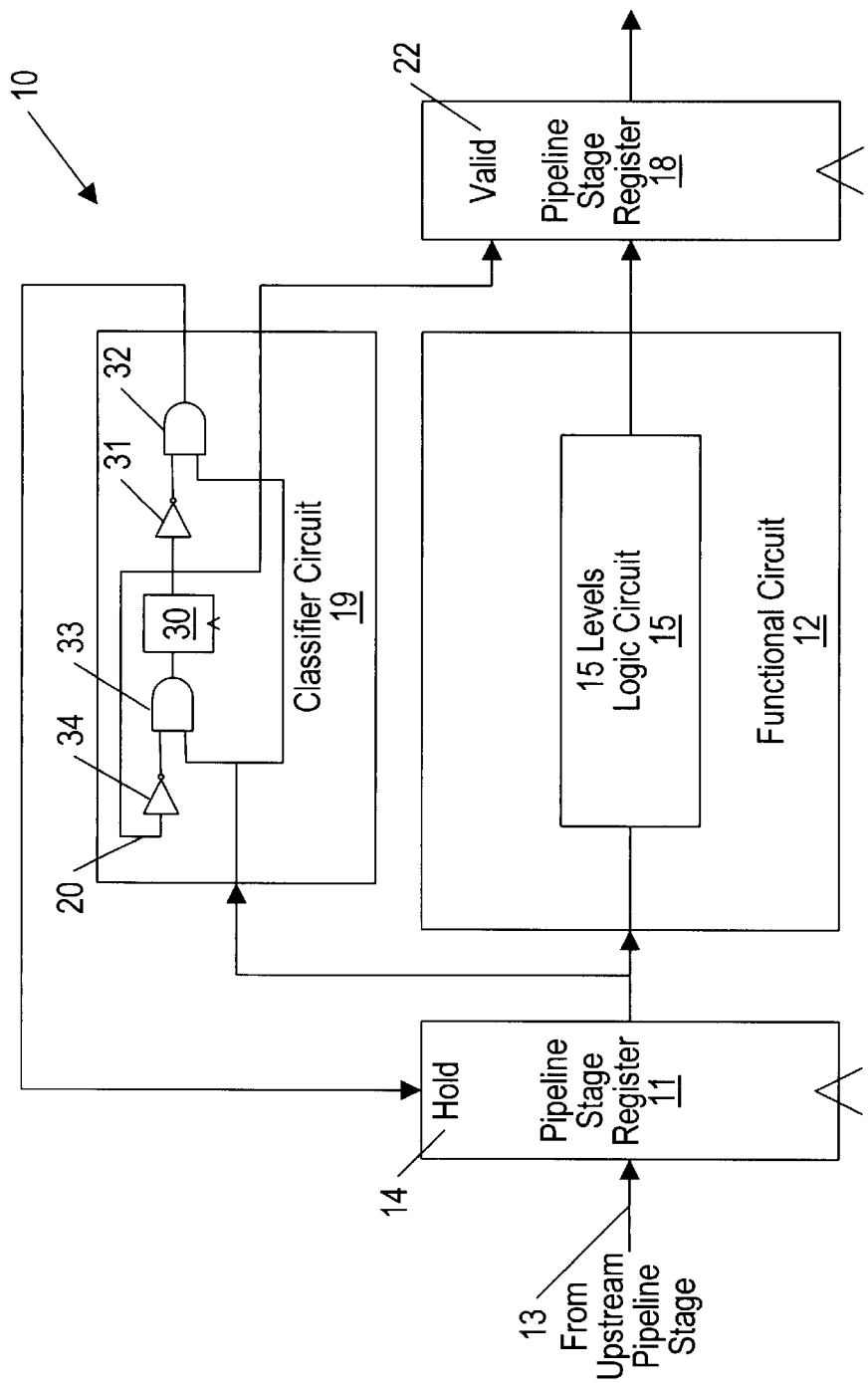
FIG. 3 is a block diagram showing a third embodiment of a pipeline stage with a slow execution path and a classifier circuit in accordance with the present invention.

Turning now to FIG. 3, a third embodiment of a pipeline stage 10 is shown. This embodiment differs from the previous embodiments in that functional circuit 12 includes a single logic circuit 15. Logic circuit 15 again comprises fifteen cascaded levels of logic. If pipeline stage 10 is to be included in a pipeline with other stages (not shown) having functional circuits 12 comprising eight cascaded levels of logic or less, the clock cycle associated with the pipeline can be equal to the delay of eight cascaded levels of logic if classifying circuit 19 as shown in FIG. 3 is included. The operation status produced by classifying circuit 19 is an invalid value and a hold value (stalling the pipeline) if pipeline stage register 11 samples a new, valid value during a clock cycle. During the clock cycle following a clock cycle in which register 11 sampled a new, valid value, the operation status is a valid value and a release value (advancing the pipeline). If register 11 is not storing a valid value in a clock cycle, the operation status is an invalid value and a release value.

Therefore, logic circuit 20 of classifying circuit 19 comprises (for the embodiment of FIG. 3) a register 30, a pair of inverters 31 and 34, and a pair of AND gates 32 and 33. Register 30 stores a logical one in the clock cycle following a newly received valid input value and a logical zero in the remaining clock cycles. If the input value is valid and a valid input value was not sampled in the previous clock cycle (as indicated by a logical zero stored within register 30), a logical one will be stored within register 30. If the input value is invalid, a logical zero will be stored within register 30. If the input value is valid and the same as the input value sampled in the previous clock cycle, a hold operation status was generated in the previous clock cycle. Therefore, this operation will not store a logical one in register 30. The input to register 30 is computed using inverter 34 and AND gate 33. Inverter 34 is coupled between the output of register 30 and AND gate 33. AND gate 33 is coupled between the inverter 34, the input valid value from register 11, and the input to register 30.

The output of register 30 is the operation status valid/invalid value because it is a logical one (valid) the clock cycle following a newly received valid input value and zero (invalid) in other clock cycles. The hold/release value is generated when the output of register 30 is a logical zero and a valid input value is detected in a clock cycle. Inverter 31 and AND gate 32 perform this function. Therefore, a hold value is generated each clock cycle in which a newly received input value is valid.

It is understood that although the embodiments shown as FIGS. 1, 2, and 3 contain a circuit with a fundamental limit of fifteen cascaded levels of logic, other embodiments could have fundamental limits of varying numbers of cascaded levels of logic. Furthermore, other embodiments may contain logic circuits 16 that implement a different fraction of the number of cascaded levels of logic in the fundamental limit circuit. Also, the logical representations of the hold value, the release value, the valid value, and the invalid value of classification circuit 19 may vary from embodiment to embodiment. It is noted that more than one pipeline stage may have a classifying circuit associated with it. Particularly, one embodiment of the present invention is a pipeline of tasks requiring fifteen cascaded levels of logic to implement, each with a classifying circuit similar to the one shown in FIG. 3, with a clock cycle equal to the delay required for eight cascaded levels of logic.

Figure 4:
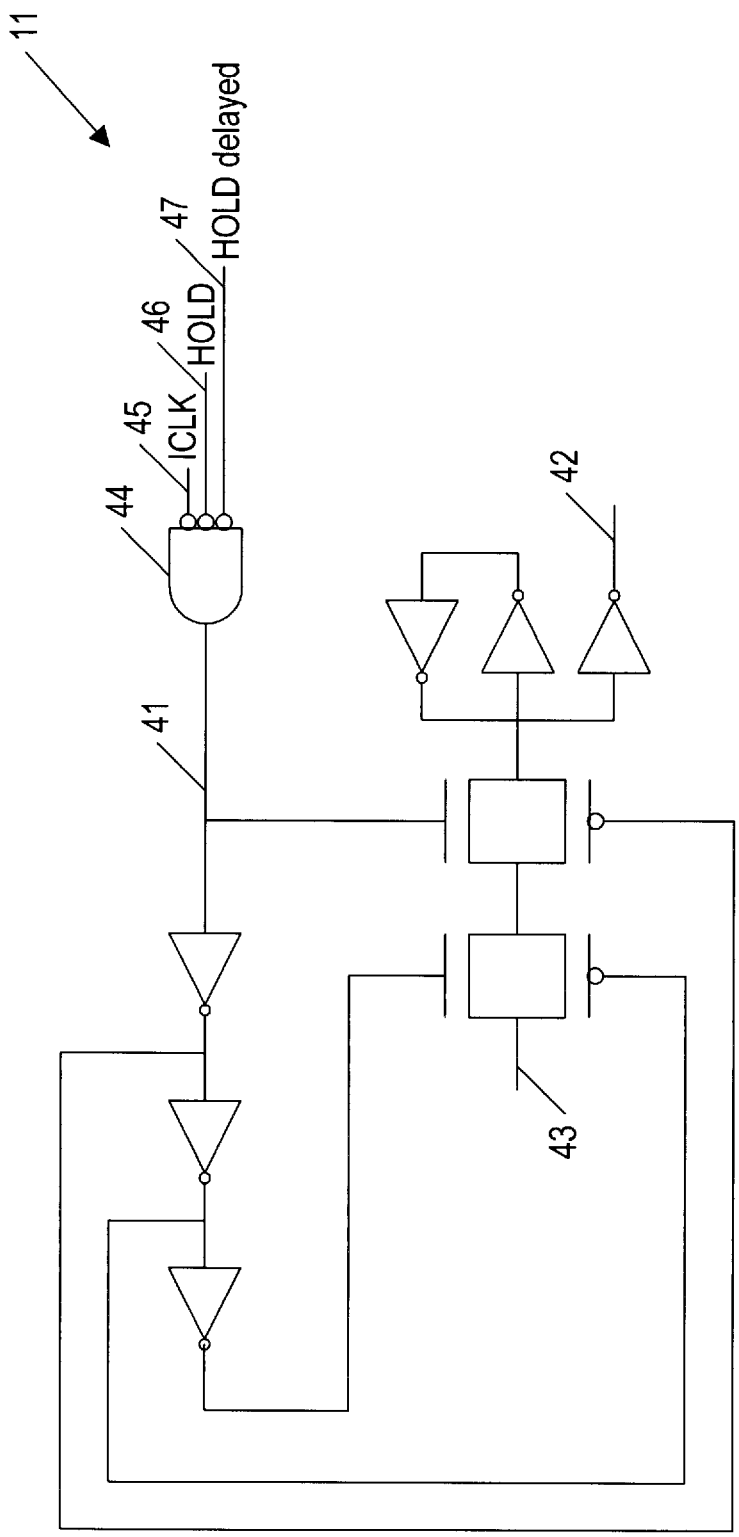
FIG. 4 is a diagram of a single phase register circuit.

Turning now to FIG. 4, an embodiment of register 11 is shown. Generally speaking, register 11 is configured with an input line 43, an output line 42, a clock input line 41, and a clock gating circuit 44. On the rising edge of the clock signal conveyed on clock input line 41, the signal on input line 43 is sampled and stored within register 11, and an inversion of the value stored is conveyed on output line 42. The purpose of gating circuit 44 is to disable the clock signal on cycles in which the signal on hold input port 14 is active, such that the rising edge that enables sampling of input line 43 does not occur on clock input line 41 for that clock cycle. Gating function 44 is represented by an AND gate with inverting inputs. An inverted version of the clock signal connected to register 11 is conveyed on a first input line 45 of gating circuit 44. The hold signal on hold input port 14 is conveyed on a second input line 46 of gating circuit 44. Hold input port 14 is connected to an inverter chain (not shown) configured to delay the hold signal conveyed on hold input port 14; and the output line of the inverter chain is connected as a third input line 47 to gating circuit 44. A single bit is shown being stored within register 11 in FIG. 4. However, it is understood that register 11 is configured with more than a single bit, as ellipses on FIG. 4 indicate. It is noted that register 11 is configured similarly to a register described in the copending, commonly assigned patent application entitled "Conditional Latching Mechanism and Pipelined Microprocessor Employing Same", Ser. No. 08/400,608, filed Mar. 8, 1995 by Witt, et al. The disclosure of the referenced patent application is incorporated herein in its entirety.

Figure 5:
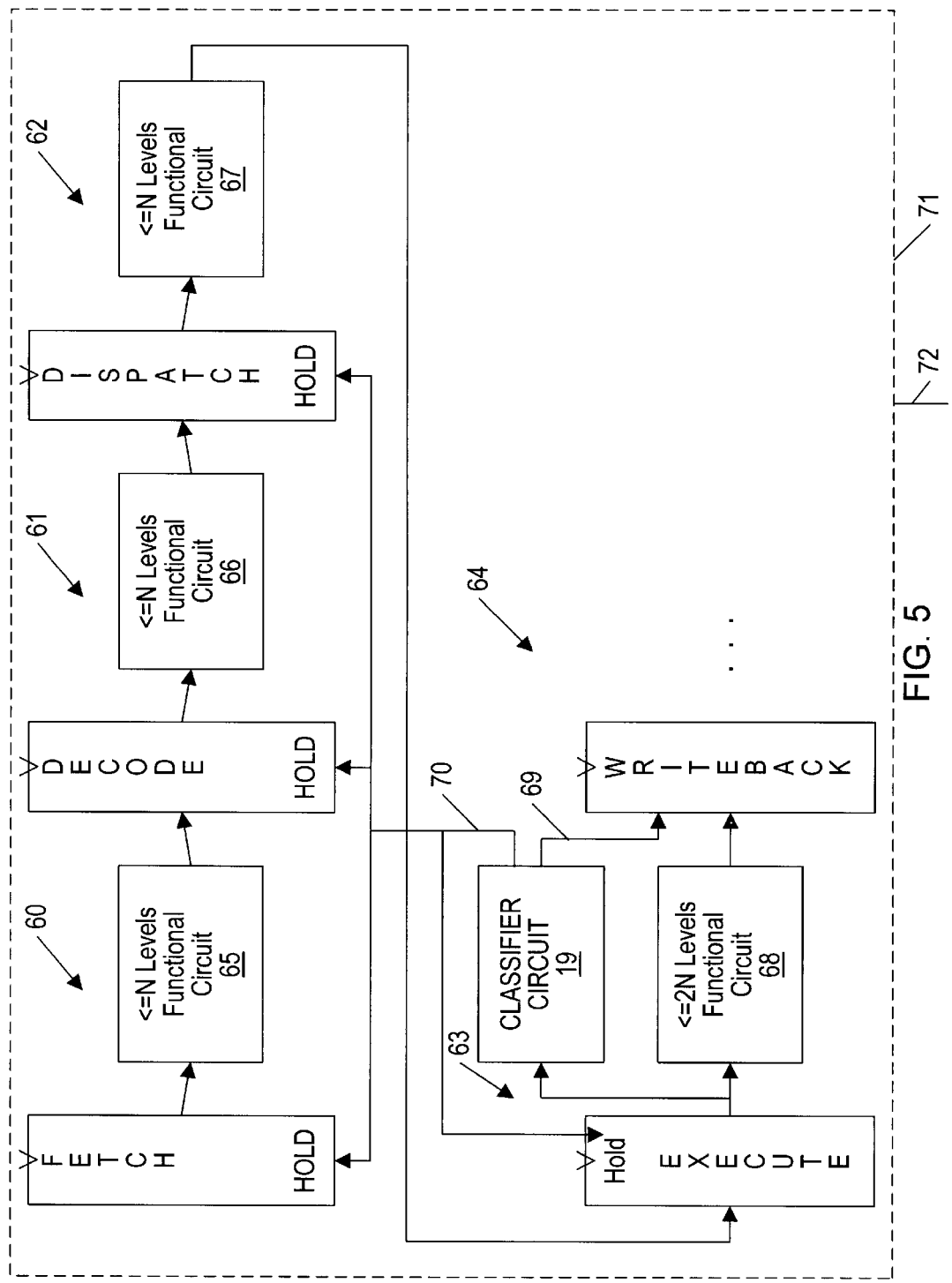
FIG. 5 is a block diagram of a microprocessor having a microprocessor pipeline with an execution stage employing the classifier circuit in accordance with the present invention.

Turning now to FIG. 5, an embodiment of a microprocessor 71 including an instruction processing pipeline is shown. Microprocessor 71 is configured with a clock input line 72 which conveys a clock signal. The clock signal defines the time interval for advancing the pipeline as the time elapsing between two consecutive rising edges. Alternatively, the time interval may be defined as the time elapsing between two consecutive falling edges. The time interval so defined is typically referred to as the clock cycle. This embodiment has a fetch stage 60, a decode stage 61, a dispatch stage 62, an execute stage 63, and a writeback stage 64. Writeback stage 64 is partially shown. Fetch stage 60 provides an instruction fetching function. Similarly, decode stage 61 provides a decoding function; dispatch stage 62 provides a dispatching function; execute stage 63 provides an executing function; and writeback stage 64 provides a writeback function. It is understood that other embodiments may contain other numbers of pipeline stages which implement various portions of the functions described.

In this embodiment, the fetching function 65, the decoding function 66, and the dispatching function 67 are implemented in less than or equal to a certain number of cascaded logic levels (denoted by the value N). The executing function 68, however, cannot be fully implemented in less than N cascaded logic levels. Portions of the function require between N and twice N cascaded logic levels. Therefore, classifier circuit 19 is included with execute stage 63. If the current instruction in the execute stage does not require evaluation of the portions of executing function 68 that are larger than N cascaded logic levels, then valid signal 69 is asserted and the pipeline advances. However, if the current instruction in the execute stage does require evaluation of those portions of executing function 68 that are larger than N cascaded logic levels, then hold signal 70 is asserted to the execute stage and each upstream pipeline stage. Therefore, the pipeline shown in FIG. 5 is clocked with a clock cycle equal to the delay of N cascaded levels of logic, and the pipeline stalls only in those cycles in which execute stage 63 cannot complete the execution task in less than N cascaded levels of logic. It is noted that the pipeline stages downstream of execute stage 63 (for example, the writeback stage 64) are not stalled in clock cycles during which the execute stage cannot produce a value. Instead, the value transferred to the writeback stage is marked invalid and the downstream stages advance. Pipeline stages not directly upstream of the execute stage could similarly advance.

It is noted that microprocessor 71 could be configured as a superscalar microprocessor in which multiple, parallel instruction processing pipelines (such as the pipeline shown in FIG. 5) are included. Furthermore, a superscalar microprocessor could employ multiple parallel stages of the pipeline shown in FIG. 5.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a clock input line wherein said clock input line is configured to convey a signal defining a clock cycle;
   a plurality of pipeline stages including an execute stage, said execute stage having a first functional circuit adapted to receive an input value wherein said first functional circuit is configured to operate on said input value, and wherein said first functional circuit includes cascaded levels of logic requiring a first time to evaluate instructions of a first group and requiring a second time to evaluate instructions of a second group, said first time being larger than said clock cycle and said second time being smaller than said clock cycle, and wherein said first functional circuit further includes an output line configured to convey an output signal; and
   a classifying circuit adapted to receive said input value of said first functional circuit wherein said classifying circuit is configured to generate an operation status, and wherein said operation status provides information indicative of the validity of said output signal for the current clock cycle.

2. The microprocessor as recited in claim 1 wherein said operation status generated by said classifying circuit further comprises a hold value, a release value, a valid value, and an invalid value, and wherein said hold value indicates that said first functional circuit has not completed operating on said input value, and wherein said release value indicates that said first functional circuit has completed operating on said input value, and wherein said valid value indicates that said output signal of said first functional circuit is valid, and wherein said invalid value indicates that said output signal of said first functional circuit is invalid.

3. The microprocessor as recited in claim 2 further comprising a first register adapted to provide said input value of said first functional circuit wherein said first register is configured with a hold input line, and wherein said hold input line is coupled to said classifying circuit, and wherein said hold input line is configured to convey a hold signal from said classifying circuit to said register.

4. The microprocessor as recited in claim 3 wherein said hold signal of said first register is configured to be activated when said hold value is generated by said classifying circuit, and wherein said hold signal of said first register is further configured to be deactivated when said release value is generated by said classifying circuit.

5. The microprocessor as recited in claim 3 further comprising a second register wherein said second register is adapted to receive said output of said first functional circuit.

6. The microprocessor as recited in claim 5 wherein said second register is configured with a valid indicator.

7. The microprocessor as recited in claim 6 wherein said valid indicator of said second register is coupled to said classifying circuit such that said classifying circuit provides the value stored within said valid indicator, and wherein said valid indicator stores a valid indication when said classifying circuit generates a valid value, and wherein said valid indicator stores an invalid indication when said classifying circuit generates an invalid value.

8. The microprocessor as recited in claim 5 wherein said register, said second register, and said functional circuit form a pipeline, and wherein said pipeline is advanced according to said clock cycle except when said classifying circuit generates said hold value.

9. The microprocessor of claim 1, further comprising:
   a plurality of pipeline stages in series, each said pipeline stage having an input register for providing an incoming signal to said pipeline stage and having an output register for accepting an outgoing signal from said pipeline stage, said input registers and output registers of adjacent ones of said stages being coincident with each other;
   one of said pipeline stages being an execute stage, said execute stage containing said first functional circuit and said classifying circuit, said incoming signal of said execute stage being said input value, said outgoing signal of said execute stage being said output signal, said cascaded levels of logic requiring a time to evaluate that is larger than said clock cycle defining a first logic path, said first functional circuit further including cascaded levels of logic requiring a time to evaluate that is smaller than said clock cycle, said cascaded levels of logic requiring a time to evaluate that is smaller than said clock cycle defining a second logic path, said output signal being generated via one of said first and second logic paths.

10. The microprocessor of claim 9, wherein during a clock cycle in which said execute stage output signal is generated via said first logic path, each of said stages subsequent to said execute stage in said series is advanced at the beginning of the next clock cycle and said execute stage and each of said stages prior to said execute stage in said series is stalled at the beginning of the next clock cycle.

11. The microprocessor of claim 10, wherein said execute stage and each of said stages prior to said execute stage in said series is stalled by conveying said operation status generated by said classifying circuit to said input register of said execute stage and each of said stages prior to said execute stage in said series and thereby causing said input registers to retain said incoming signals.

12. The microprocessor of claim 9, wherein during a clock cycle in which said execute stage output signal is generated via said second logic path, each of said stages in said series is advanced at the beginning of the next clock cycle.

13. The microprocessor of claim 1, further comprising a decode stage, a dispatch stage and a writeback stage.

14. The microprocessor of claim 1 wherein said classifying circuit is coupled to said execute stage and configured to stall said execute stage for one clock cycle upon receipt of an instruction of said first group.

15. A classifying circuit comprising:
   an input bus;
   a circuit coupled to said input bus wherein said circuit is configured to operate on an input value conveyed on said input bus, said circuit being further configured to determine whether an associated functional circuit will require more than one cycle to generate an output value from said input value and determine an operation status of said associated functional circuit;

an output bus conveying said operation status of said functional circuit.

16. The classifying circuit as recited in claim 15 wherein said operation status comprises a hold value and a release value.

17. The classifying circuit as recited in claim 16 wherein said hold value indicates said input should remain constant.

18. The classifying circuit as recited in claim 16 wherein said release value indicates said input is permitted to change.

19. The classifying circuit as recited in claim 15 wherein said operation status comprises a valid value and an invalid value.

20. The classifying circuit as recited in claim 19 wherein said valid value indicates that said associated functional circuit is completing operation on said input.

21. The classifying circuit as recited in claim 20 wherein said invalid value indicates that said associated functional circuit is continuing to operate on said input.

22. A method for operating a pipeline stage in a microprocessor, wherein said pipeline stage accepts an input value and performs an operation on said input value and wherein said pipeline stage comprises a classifying circuit which accepts said input value and a pipeline stage register, comprising:

determining whether said pipeline stage requires more than one cycle to perform said operation on said input value;

advancing said pipeline stage in clock cycles wherein said classifying circuit generates a release value; and stalling said pipeline stage in clock cycles wherein said classifying circuit generates a hold value.

23. The method as recited in claim 22 further comprising continuing to execute an operation already in progress in a clock cycle following said stalling step.

* * * * *